United States Patent
Zhou et al.

(10) Patent No.: US 11,138,381 B2
(45) Date of Patent: Oct. 5, 2021

(54) METHOD, COMPUTER DEVICE AND READABLE MEDIUM FOR USER'S INTENT MINING

(71) Applicant: BAIDU ONLINE NETWORK TECHNOLOGY (BEIJING) CO., LTD., Beijing (CN)

(72) Inventors: Hao Zhou, Beijing (CN); Hao Huang, Beijing (CN); Deqiang Cao, Beijing (CN); Dongdong Su, Beijing (CN); Sitong Chen, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 243 days.

(21) Appl. No.: 16/507,712

(22) Filed: Jul. 10, 2019

(65) Prior Publication Data

US 2020/0034431 A1     Jan. 30, 2020

(30) Foreign Application Priority Data

Jul. 25, 2018  (CN) .......................... 201810824314.1

(51) Int. Cl.
*G06F 40/30*     (2020.01)
*G06F 16/951*    (2019.01)
(Continued)

(52) U.S. Cl.
CPC ............ *G06F 40/30* (2020.01); *G06F 16/951* (2019.01); *G06F 16/9535* (2019.01); *G06F 40/205* (2020.01)

(58) Field of Classification Search
CPC ...... G06F 40/30; G06F 40/205; G06F 16/951; G06F 16/9535; G06F 16/335; G06F 40/284; G06Q 30/0255
See application file for complete search history.

(56) References Cited

U.S. PATENT DOCUMENTS

| 7,437,368 B1* | 10/2008 | Kolluri | G06Q 30/02 |
| 2006/0155728 A1* | 7/2006 | Bosarge | G06F 16/955 |
| 2012/0209879 A1 | 8/2012 | Banerjee et al. | |

FOREIGN PATENT DOCUMENTS

| CN | 107103049 A | 8/2017 |
| CN | 108230007 A | 6/2018 |
| WO | 2015042830 A1 | 4/2015 |

OTHER PUBLICATIONS

The First Office Action dated Jun. 21, 2019 in CN application 201810824314.1 with translation from Google Translate.
(Continued)

*Primary Examiner* — Andrey Belousov
(74) *Attorney, Agent, or Firm* — Ladas & Parry, LLP

(57) ABSTRACT

A method, a computer device and a readable medium user's intent mining are disclosed. The method includes: obtaining text feature information corresponding to behavior data of a user; extracting an intent information list corresponding to the behavior data by using a pre-trained intent extracting model; and obtaining the target intent information of the user from the intent information list corresponding to the behavior data of the user, according to the text feature information and the intent information list corresponding to the behavior data, and a preset semantic similarity threshold, and adding the target intent information of the user to an intent information queue for advertisement recommendation. The technical solutions may make up for the deficiencies of the prior art, and may accurately and effectively mine the user's intent information, so as to effectively perform advertisement recommendation according to the user's intent information, thereby effectively improving the advertisement recommendation efficiency.

7 Claims, 2 Drawing Sheets

(51) Int. Cl.
 *G06F 16/9535* (2019.01)
 *G06F 40/205* (2020.01)

(56) References Cited

OTHER PUBLICATIONS

Search Report for CN 201810824314.1 dated Jun. 21, 2019 and its English translation provided by Google Translate.

\* cited by examiner

METHOD, COMPUTER DEVICE AND READABLE MEDIUM FOR USER'S INTENT MINING

CROSS REFERENCE TO RELATED APPLICATIONS

The present application claims the priority of Chinese Patent Application No. 201810824314.1, filed on Jul. 25, 2018, with the title of "Method, apparatus, computer device and readable medium for user's intent mining". The disclosure of the above application is incorporated herein by reference in its entirety.

TECHNICAL FIELD

The present disclosure relates to the technical field of computer application, and particularly to a method, a computer device and a readable medium for user's intent mining.

BACKGROUND

As the mobile era advances, content ecology is booming, and more and more display-type scene traffic appears in people's daily life, and advertisers are willing to obtain more display-type business traffic.

In the prior art, in an information flow scenario, users mainly aim to browse and have no explicit retrieval behaviors, and an advertiser may not directly obtain the user's intent. Generally, advertisements are recommended to the users only according to user's feature information such as age, profession, identity, hobbies and the like. However, in this scenario, because the user's true intent may not be obtained, the recommended advertisement may be not certainly the advertisement that the user really wants to click and view when browsing, which causes low recommendation efficiency.

Based on the above problems, it is required to provide a user's intent mining technical solution in the information flow scenario to perform advertisement recommendation according to user's intent, thereby improving the advertisement recommendation efficiency.

SUMMARY

Embodiments of the present disclosure propose a method, an apparatus, a computer device and a readable medium for user's intent mining, to remedy drawbacks in the prior art and provide an effective user's content mining solution.

An embodiment of the present disclosure proposes a method for user's intent mining which includes:

obtaining text feature information corresponding to the behavior data of a user;

extracting an intent information list corresponding to the behavior data of the user by using a pre-trained intent extracting model;

obtaining target intent information of the user from the intent information list corresponding to the behavior data of the user, according to the text feature information and the intent information list corresponding to the behavior data, and a preset semantic similarity threshold, and adding the target intent information of the user to an intent information queue for advertisement recommendation.

An embodiment of the present disclosure further proposes an apparatus for user's intent mining which includes:

a feature obtaining module configured to obtain text feature information corresponding to the behavior data of a user;

an extracting module configured to extract an intent information list corresponding to the behavior data of the user by using a pre-trained intent extracting model;

an intent obtaining module configured to, obtain target intent information of the user from the intent information list corresponding to the behavior data of the user, according to the text feature information and the intent information list corresponding to the behavior data, and a preset semantic similarity threshold, and add the target intent information of the user to an intent information queue for advertisement recommendation.

An embodiment of the present disclosure further proposes a computer device which includes:

one or more processors, a memory for storing one or more programs, the one or more programs, when executed by said one or more processors, enable said one or more processors to implement the above-mentioned method for user's intent mining An embodiment of the present disclosure further proposes a computer readable medium on which a computer program is stored, the program, when executed by a processor, implementing the above-mentioned method for user's intent mining According to the method and apparatus for user's intent mining, the computer device and the readable medium according to embodiments of the present disclosure, it is feasible to obtain text feature information corresponding to the behavior data of a user; extract an intent information list corresponding to the behavior data by using a pre-trained intent extracting model; obtain target intent information of the user from the intent information list corresponding to the behavior data of the user, according to the text feature information and the intent information list corresponding to the behavior data, and a preset semantic similarity threshold, and add the target intent information of the user to the intent information queue for advertisement recommendation. The technical solutions according to an embodiment of the present disclosure may make up for the deficiencies of the prior art, and accurately and effectively mine the user's intent information, so as to effectively perform advertisement recommendation according to the user's intent information, thereby effectively improving the advertisement recommendation efficiency.

DETAILED DESCRIPTION OF EMBODIMENTS

The present disclosure will be described in detail with reference to figures and specific embodiments to make objectives, technical solutions and advantages of the present disclosure more apparent.

Figure 1:
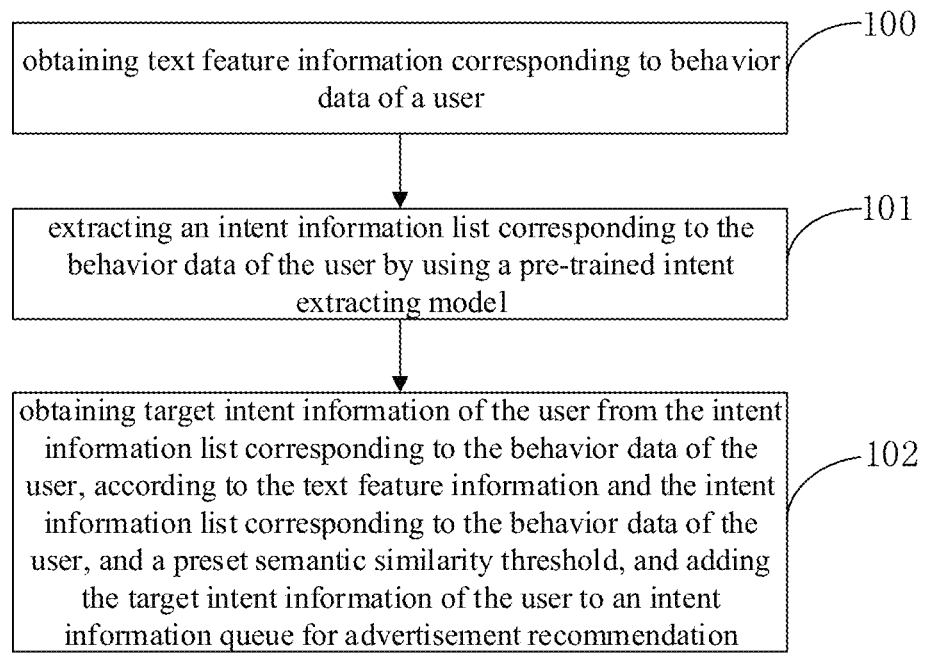
FIG. 1 is a flow chart illustrating a method for user's intent mining according to an embodiment of the present disclosure.

FIG. 1 is a flow chart illustrating a method for user's intent mining according to an embodiment of the present disclosure. As shown in FIG. 1, the method for user's intent mining according to the embodiment may specifically include the following steps:

100: obtaining text feature information corresponding to behavior data of a user;

101: extracting an intent information list corresponding to the behavior data by using a pre-trained intent extracting model;

102: obtaining target intent information of the user from the intent information list corresponding to the behavior data, according to the text feature information and the intent information list corresponding to the user's behavior data, and a preset semantic similarity threshold, and adding the target intent information of the user to an intent information queue for advertisement recommendation.

A subject for performing the method for user's intent mining according to an embodiment may be an apparatus for user's intent mining. The apparatus for user's intent mining may be disposed in a server, and may mine the user's intent based on the behavior data of a user, for example browsing a page, to perform advertisement recommendation, and thus may effectively improve the accuracy of the advertisement recommendation, improve the user's click rate of the recommended advertisement, and thereby effectively improve the efficiency of the advertisement recommendation.

Specifically, for the user's intent mining according to this embodiment, the text feature information corresponding to the behavior data of the user may be obtained first, the text feature information may uniquely (to a certain extent) identify a browsed page corresponding to the user's behavior data. For example, the text feature information may be identified by a group of words.

For example, step 100 in this embodiment may specifically include the following steps:

(a1) obtaining a title and key text content of a browsed page corresponding to the behavior data of the user;

(b1) performing word segmentation for the title of the browsed page to obtain a plurality of segmented words of the title;

(c1) extracting a plurality of content keywords from the key text content by using a pre-trained content keyword extracting model;

(d1) combining the plurality of segmented words of the title and the plurality of content keywords to form text feature information of the browsed page.

In this embodiment, there is a title in the browsed page corresponding to the behavior data of the user. In this embodiment, the title of the user-browsed page is obtained as a basis for user's intent mining. On the other hand, the user-browsed page may also include a paragraph of text content as the key text content of the browsed page, which may effectively summarize the content of the browsed page. In practical application, when an abstract is included in the browsed page, the key text content of the browsed page may be the abstract in the browsed page. If an abstract is not included in the browsed page, the first paragraph of the browsed page may be selected as the key text content of the browsed page, since the first paragraph of the browsed page usually summarizes the content of the browsed page. Alternatively, other paragraph, such as the last paragraph, may also be selected as the key text content of the browsed page, according to characteristics of the browsed page.

In this embodiment, performing word segmentation for the title of the browsed page may specifically employ a work segmentation technology often used in the prior art to divide the title of the browsed page into a plurality of segmented words of the title. Reference may be made to relevant prior art for details which will not be detailed herein.

In this embodiment, a content keyword extracting model may be pre-trained, and may extract, from a paragraph of text content, a plurality of content keywords capable of identifying this paragraph of content. Based on this principle, the content keyword extracting model may be employed to extract the plurality of content keywords from the key text content.

In this embodiment, the content keyword extracting model may be trained by using the training principle of a neural network model. Training corpus may be collected in advance. For example, the training corpus in this embodiment may include hundreds of thousands of pieces of training data. The more the training data are, the more accurately the trained content keyword extracting model extracts. Each piece of training data in this embodiment may include a paragraph of training text and a plurality of content keywords collected in advance.

Upon training, each piece of training data is input into the content keyword extracting model, and a plurality of content keywords extracted by the content keyword extracting model are obtained. Then, it is judged whether the extracted plurality of content keywords are consistent with the collected plurality of content keywords. If the extracted plurality of content keyword are inconsistent with the collected plurality of content keywords, the parameters of the content keyword extracting model are modified, so that the extracted plurality of content keywords are consistent with the collected plurality of content keywords. In the above training manner, the content keyword extracting model is trained by using all the training data until the extracted plurality of content keywords are consistent with the collected plurality of content keywords, the training is completed, and the parameters of the content keyword extracting model are determined, and thus the content keyword extracting model is determined.

Finally, the plurality of segmented words of the title and the plurality of content keywords of the browsed page are combined to form the text feature information of the browsed page, and the text feature information is most likely to identify the content of the browsed page.

In specific implementation of step 101 of this embodiment, each piece of behavior data may be input into the pre-trained intent extracting model, and the intent extracting model outputs a plurality of pieces of intent information corresponding to the behavior data to constitute an intent information list corresponding to the behavior data. In an embodiment, each piece of behavior data corresponds to an intent information list.

A plurality of pieces of intent information of a user may be predicted according to the behavior data of the user and the intent extracting model.

The training principle of the intent extracting model in this embodiment is similar to the training of the content keyword extracting model described above. The training corpus may be collected in advance. Likewise, the training corpus may include hundreds of thousands of pieces of training data, and each piece of training data may include training behavior data of a user and collected corresponding intent information. Then, during the process of training, the training behavior data of a user in each piece of training data is input into the intent extracting model, and the intent extracting model predicts the intent information thereof, and then compares the predicted intent information with the collected intent information to determine whether the two are consistent; if they are inconsistent, adjust parameters of the intent extracting model so that the two are made consistent. In the above training manner, the intent extracting model is trained by using a great amount of the training data until the predicted intent information is consistent with the collected intent information, the training is completed, and the parameters of the intent extracting model are determined, and thus the intent extracting model is determined.

Then, in step 102, it is possible to calculate respectively semantic similarity between the text feature information corresponding to the behavior data of the user and respective intent information included in the intent information list corresponding to the behavior data of the user; and obtain, from the intent information list corresponding to the behavior data of the user, intent information whose semantic similarity with the text feature information corresponding to the behavior data of the user is greater than the preset semantic similarity threshold, as the target intent information of the user.

Alternatively, the behavior data in this embodiment may include real-time behavior data and/or a plurality of pieces of historical behavior data of the user in the latest historical time period. In this case, step 100 "obtaining text feature information corresponding to the behavior data of a user" may accordingly include: obtaining text feature information corresponding to the real-time behavior data of the user; and/or obtaining text feature information corresponding to each piece of historical behavior data of the user.

That is to say, the behavior data of the user in this embodiment may specifically include the following two major classes:

The first major class includes the real-time behavior data of the user; when the target intent information of a user is mined, the target intent information corresponding to the real-time behavior data is more indicative of the user's intent and requirement, and more representative, and may be preferentially added to the intent information queue of the user for advertisement recommendation.

The second major class includes the historical behavior data of the user. For example, in order to make full use of the historical behavior data of the user for user's intent mining, the historical behavior data of the user in this embodiment may specifically be a plurality of pieces of historical behavior data of the user in the latest historical time period. For example, the latest historical time period may be the latest 6 hours, 8 hours, 10 hours or 24 hours before the current time, or even may be a time period of 7 days, 10 days or one month, or may be set as a period of other time length according to actual needs, which will not be detailed herein.

In this embodiment, according to actual demands, it is further possible to take a plurality of pieces of historical behavior data in two latest historical time periods of different time length. For example, it is possible to simultaneously take a plurality of pieces of historical behavior data of the user in a latest first historical time period and a plurality of pieces of historical behavior data of the user in a latest second historical time period, and the first historical time period is longer than the second historical time period. For example, it is possible to simultaneously take all historical behavior data of the user in the latest eight hours, and all historical behavior data of the user in the latest seven days. As such, when the user's intent is mined, the closer to the current time, the more the user's intent and demands can be reflected, and the user's purpose intent mined based on all historical behavior data in a small historical time period (e.g., the latest 8 hours) is preferentially added to the intent information queue of the user for advertisement recommendation. If there are a large number of target intents mined based on all historical behavior data in a large historical time period (e.g., the latest seven days), a portion of the target intents may be selected and added to the intent information queue of the user for advertisement recommendation.

In view of the above two large classes of behavior data, the behavior data of the user in an embodiment may be specifically classified into the following cases:

In a first case, the behavior data of the user includes real-time behavior data of the user only;

The real-time behavior data is the data of the page that is currently browsed by the user. At this time, correspondingly, an intent information list corresponding to the real-time behavior data may be obtained in step 101.

At this time, correspondingly, step 102 may specifically include the following steps:

(a2) calculating respectively semantic similarity between the text feature information corresponding to the real-time behavior data and respective intent information included in the intent information list corresponding to the real-time behavior data;

(b2) obtaining, from the intent information list, intent information whose semantic similarity with the text feature information corresponding to the real-time behavior data is greater than the preset similarity threshold, as the user's target intent information, and adding the intent information to the intent information queue for advertisement recommendation.

Specifically, when the intent information list corresponding to the real-time behavior data is extracted by using step 101, the intent information list may include too much intent information, some of which may not be much associated with the real-time behavior data. In this embodiment, the intent information in the intent information list corresponding to the real-time behavior data is filtered through steps (a2) and (b2), thereby obtaining more accurate target intent information of the user.

For example, it is feasible to firstly respectively calculate the semantic similarity between the text feature information corresponding to the real-time behavior data and each intent information in the intent information list corresponding to the real-time behavior data; and judge whether each semantic similarity is greater than the preset similarity threshold, and if the sematic similarity is greater than the similarity threshold, determine that the intent information corresponding to the semantic similarity may be retained, otherwise it is filtered out. In this way, the retained intent information may be used as the target intent information of the user, and may be added to the intent information queue for advertisement recommendation.

In a second case, the user's behavior data only includes a plurality of pieces of historical behavior data in the latest historical time period; the length of the latest historical time period in this embodiment may be set according to actual needs. Specifically, the latest historical time period in this embodiment may include a plurality of pieces of historical behavior data. For each piece of historical behavior data, an intent information list corresponding to the historical behavior data may be obtained according to step 101.

Then, step 102 may be implemented correspondingly with the following steps:

(a3) for each piece of the plurality of pieces of historical behavior data, calculating respectively semantic similarity between the text feature information corresponding to the historical behavior data and respective intent information included in the intent information list corresponding to the historical behavior data;

(b3) for each piece of the plurality of pieces of historical behavior data, obtaining, from the intent information list corresponding to the historical behavior data, intent information whose semantic similarity with the text feature information corresponding to the historical behavior data is greater than the preset similarity threshold, as candidate intent information, and obtaining a plurality of candidate intent information in total;

(c3) obtaining N pieces of target intent information from the plurality of candidate intent information, and adding the N pieces of target intent information to the intent information queue for advertisement recommendation.

Specifically, each piece of historical behavior data may be processed by referring to the processing of the real-time behavior data in the first case, so that the intent information which corresponds to the piece of historical behavior data and whose semantic similarity with the corresponding text feature information is larger than the preset similarity threshold is obtained as the candidate intent information. As such, a plurality of candidate intent information may be obtained in total with respect to the plurality of pieces of historical behavior data. Since the amount of data of the historical behavior data is large, the number of the plurality of candidate intent information obtained is also large. In this case, if the advertisement recommendation is performed based on the plurality of candidate intent information, this will make purposefulness of the advertisement recommendation not strong, and cause recommended advertisements to have a lower click-through rate, which affects the efficiency of advertisement recommendation. In this embodiment, it is feasible to filter the plurality of pieces of candidate intent information, obtain N pieces of target intent information therefrom, and add the N pieces of target intent information into the intent information queue.

In this embodiment, when the N pieces of target intent information is obtained from the plurality of pieces of candidate intent information, it is specifically possible to sort the plurality of candidate intent information first, and then obtain the N pieces of target intent information in a sorted order. For example, in this embodiment, the user's intent information may attenuate over time; if the last historical moment when the user browses a page of a certain intent information is closer to the current moment, this indicates that the user's intent to browse the intent information is strong; otherwise, if the last historical moment when the user browses the page of the certain intent information is farther from the current moment, this indicates that the user's intent to browse the intent information is weak. Therefore, the sorting may be performed in a small-to-large order of the time interval between the last historical moment when the user browses the page corresponding to each type of candidate intent information and the current moment. It is possible to obtain the N pieces of intent information in a small-to-large order of time interval from the current moment after the sorting, as the target intent information, and add them to the intent information queue for advertisement recommendation.

Alternatively, in this embodiment, the sorting may be performed in a descending order of times of the user historically clicking the advertisement corresponding to each type of candidate intent information. The more times the user browses each type of candidate intent information, the stronger the user's intent to browse this type of intent information. On the contrary, the fewer times the user browses each type of candidate intent information, the weaker the user's intent to browse this type of intent information. As such, it is possible to obtain the N pieces of intent information in a descending order of times of the user clicking the advertisement corresponding to each type of candidate intent information, as the target intent information, and add them to the intent information queue for advertisement recommendation.

In the above manner, the last moment of the user historically browsing the page corresponding to each type of candidate intent information and the times of the user clicking the advertisement corresponding to each type of intent information may be obtained from the historical behavior data of the user.

In addition, optionally, when a plurality of candidate intent information are sorted in this embodiment, the sorting may performed by further referring to an average value of the advertisement clicked by the user and corresponding to each type of candidate intent. The average value of the advertisement clicked by the user and corresponding to each type of candidate intent may be obtained by dividing a total value of the advertisement clicked by the user and corresponding to each type of candidate intent by total click times. The value of the advertisement in this embodiment is the fee charged for an advertiser for putting the advertisement for the advertiser. In practical applications, it is also possible to sort the plurality of candidate intent information in other manners, obtain N pieces of intent information in the sorted order, as the target intent information. Detailed description will not be presented one by one herein. In this embodiment, it is more purposeful to obtain N pieces of intent information from the plurality of pieces of candidate intent information, as the target intent information for advertisement recommendation, thereby effectively improving the accuracy of advertisement recommendation, and then increasing the click-through rate of advertisements, and achieving commercial intent and commercial value of advertisements.

In the third case, the behavior data of the user includes a plurality of pieces of historical behavior data in at least two latest historical time periods. In this embodiment, the behavior data includes a plurality of pieces of historical behavior data in two latest historical time periods. If more than two historical time periods are included, the principle is similar, and no detailed description will be presented any more.

For example, the user's behavior data includes a plurality of pieces of historical behavior data of the user in the latest first historical time period and a plurality of pieces of historical behavior data of the user in the latest second historical time period, and the first historical time period is larger than the second historical time period.

At this time, the step 102 may be specifically implemented by the following steps:

(a4) for each piece of the plurality of pieces of historical behavior data in the first historical time period and second historical time period, calculating respectively semantic similarity between the text feature information corresponding to the historical behavior data and respective intent information included in the intent information list corresponding to the historical behavior data;

(b4) for each piece of the plurality of pieces of historical behavior data in the first historical time period and second historical time period, obtaining, from the intent information list corresponding to the historical behavior data, intent information whose semantic similarity with the text feature information corresponding to the historical behavior data is greater than the preset similarity threshold, as candidate intent information, and respectively obtaining M pieces of candidate intent information in the first historical time period and W pieces of candidate intent information in the second historical time period;

(c4) under the condition that W is smaller than a preset number N of target intent information, adding the W pieces of candidate intent information in the second historical time period to the intent information queue, as the target intent information of the user;

(d4) obtaining N-W pieces of target intent information from the M pieces of candidate intent information in the first historical time period, and adding the N-W pieces of target intent information to the intent information queue for advertisement recommendation.

N, M, and W in this embodiment are all positive integers. In practical application, any value that satisfies the condition may be taken according to requirements. Since the first historical time period is greater than the second historical time period, namely, the second historical time period is closer to the current moment, it is more representative of the user's real intent. In this implementation, preferably, the target W pieces of candidate intent information corresponding to the plurality of historical behavior data in the second historical time period is obtained, and if the W is smaller than the preset number N of the target intent information, the W pieces of candidate intent information in the second historical time period is considered as the target intent information of the user and added to the intent information queue for advertisement recommendation. Then, the N-W pieces of target intent information is obtained from the M pieces of candidate intent information in the first historical time period. Reference may be made to the manner in the above second case for a specific obtaining manner: first sort the M pieces of candidate intent information, and obtain the first N-W pieces of candidate intent information in the sorting order, as the target intent information. For the specific sorting manner, please refer to the related depictions in the above second case, and detailed depictions are not presented any more here.

In the fourth case, the behavior data of a user includes real-time behavior data and a plurality of historical behavior data in a latest historical time period;

In this case, the step 102 may specifically be implemented by the following steps:

(a5) obtaining S pieces of target intent information of the user corresponding to the real-time data, and adding the S pieces of target intent information of the user to the intent information queue;

(b5) under the condition that S is smaller than a preset number N of the target intent information, obtaining P pieces of candidate intent information corresponding to the plurality of pieces of historical behavior data;

(c5) obtaining N-S pieces of target intent information from the P pieces of candidate intent information, and adding the N-S pieces of target intent information to the intent information queue for advertisement recommendation.

In this case, during processing, the real-time behavior data may be regarded as the plurality of pieces of historical behavior data stated in the third case and having a short historical time period, and the remaining processing procedures are the same. For details, please refer to the processing as stated in the third case, detailed description is not presented any more.

If the behavior data of the user includes real-time behavior data and a plurality of pieces of historical behavior data in more than two latest historical time periods, the implementation principle is similar. Reference may be made to the processing as stated in the first case, the third case and the fourth case, and detailed depictions are not presented any more here.

According to the user's intent mining method in this embodiment, it is feasible to obtain text feature information corresponding to the behavior data of a user; extract an intent information list corresponding to the behavior data by using a pre-trained intent extracting model; according to the text feature information and the intent information list corresponding to the behavior data, and a preset semantic similarity threshold, obtain the target intent information of the user from the intent information list corresponding to the behavior data of the user, and add the target intent information of the user to the intent information queue, for advertisement recommendation. The technical solution of this embodiment may make up for the deficiencies of the prior art, and accurately and effectively mine the user's intent information, so as to effectively perform advertisement recommendation according to the user's intent information, thereby effectively improving the advertisement recommendation efficiency.

Figure 2:
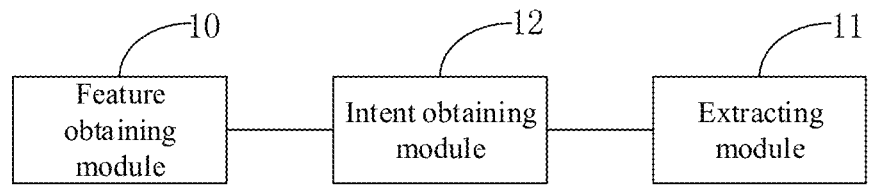
FIG. 2 is a structural diagram illustrating an apparatus for user's intent mining according to an embodiment of the present disclosure.

FIG. 2 is a structural diagram of a user's intent mining apparatus according to an embodiment of the present disclosure. As shown in FIG. 2, the user's intent mining apparatus according to this embodiment may specifically include:

a feature obtaining module 10 configured to obtain text feature information corresponding to the behavior data of a user;

an extracting module 11 configured to extract an intent information list corresponding to the behavior data by using a pre-trained intent extracting model;

an intent obtaining module 12 configured to, according to the text feature information obtained by the feature obtaining module 10 and the intent information list extracted by the extracting module 11, and a preset semantic similarity threshold, obtain the target intent information of the user from the intent information list corresponding to the behavior data of the user, and add the target intent information of the user to an intent information queue, for advertisement recommendation.

Principles employed by the user's intent mining apparatus according to this embodiment to implement the user's intent mining and the resultant technical effects with the above modules are the same as those of implementation of the above-mentioned method embodiment. For particulars, please refer to the depictions of the aforesaid relevant method embodiment, and no detailed depictions will be presented here.

Further optionally, in the user's intent mining apparatus of this embodiment, the feature obtaining module 10 is specifically configured to:

obtain a title and key text content of the browsed page corresponding to the behavior data of the user;

perform word segmentation for the title of the browsed page to obtain a plurality of segmented words of the title;

extract a plurality of content keywords from the key text content by using a pre-trained content keyword extracting model;

combine the plurality of segmented words of the title and the plurality of content keywords to form text feature information of the browsed page.

Further optionally, in the user's intent mining apparatus of the embodiment, if the behavior data includes real-time behavior data and/or a plurality of pieces of historical behavior data of the user in the latest historical time period, the feature obtaining module 10 is specifically configured to:

obtain text feature information corresponding to the real-time behavior data of the user; and/or obtain text feature information corresponding to each piece of historical behavior data of the user.

Further optionally, in the user's intent mining apparatus of this embodiment, if the behavior data includes real-time behavior data, the intent obtaining module 12 is specifically configured to:

calculate respectively semantic similarity between the text feature information corresponding to the real-time behavior data and respective intent information included in the intent information list corresponding to the real-time behavior data;

obtain, from the intent information list, intent information whose semantic similarity with the text feature information corresponding to the real-time behavior data is greater than the preset similarity threshold, as the target intent information of the user, and add the target intent information to the intent information queue, for advertisement recommendation.

Further optionally, in the user's intent mining apparatus of this embodiment, if the behavior data includes a plurality of pieces of historical behavior data of the user in the latest historical time period, the intent obtaining module 12 is specifically configured to:

for each piece of the plurality of pieces of historical behavior data, calculate respectively semantic similarity between the text feature information corresponding to the historical behavior data and respective intent information included in the intent information list corresponding to the historical behavior data;

for each piece of the plurality of pieces of historical behavior data, obtain, from the intent information list corresponding to the historical behavior data, intent information whose semantic similarity with the text feature information corresponding to the historical behavior data is greater than the preset similarity threshold, as candidate intent information, and obtain a plurality of candidate intent information in total;

obtain N pieces of target intent information from the plurality of candidate intent information, and add the N pieces of target intent information to the intent information queue for advertisement recommendation.

Further optionally, in the user's intent mining apparatus of this embodiment, the behavior data includes a plurality of pieces of historical behavior data of the user in the latest first historical time period and a plurality of pieces of historical behavior data of the user in the latest second historical time period, and the first historical time period is larger than the second historical time period; the intent obtaining module 12 is specifically configured to:

for each piece of the plurality of pieces of historical behavior data in the first historical time period and second historical time period, calculate respectively semantic similarity between the text feature information corresponding to the historical behavior data and respective intent information included in the intent information list corresponding to the historical behavior data;

for each piece of the plurality of pieces of historical behavior data in the first historical time period and second historical time period, obtain, from the intent information list corresponding to the historical behavior data, intent information whose semantic similarity with the text feature information corresponding to the historical behavior data is greater than the preset similarity threshold, as candidate intent information, and respectively obtain M pieces of candidate intent information in the first historical time period and W pieces of candidate intent information in the second historical time period;

under the condition that W is smaller than a preset number N of target intent information, add the W pieces of candidate intent information in the second historical time period to the intent information queue, as the user's target intent information;

obtain N-W pieces of target intent information from the M pieces of candidate intent information in the first historical time period, and add the N-W pieces of target intent information to the intent information queue for advertisement recommendation.

Further optionally, in the user's intent mining apparatus of this embodiment, if the behavior data includes real-time behavior data and a plurality of historical behavior data in a latest historical time period, the intent obtaining module 12 is specifically configured to:

obtain S pieces of target intent information of the user corresponding to the real-time data, and add the S pieces of target intent information of the user to the intent information queue;

under the condition that S is smaller than a preset number N of the target intent information, obtain P pieces of candidate intent information corresponding to the plurality of pieces of historical behavior data;

obtain N-S pieces of target intent information from the P pieces of candidate intent information, and add the N-S pieces of target intent information to the intent information queue for advertisement recommendation.

Principles employed by the user's intent mining apparatus according to this embodiment to implement the user's intent mining and the resultant technical effects with the above modules are the same as those of implementation of the above-mentioned method embodiment. For particulars, please refer to the depictions of the aforesaid relevant method embodiment, and no detailed depictions will be presented here.

Figure 3:
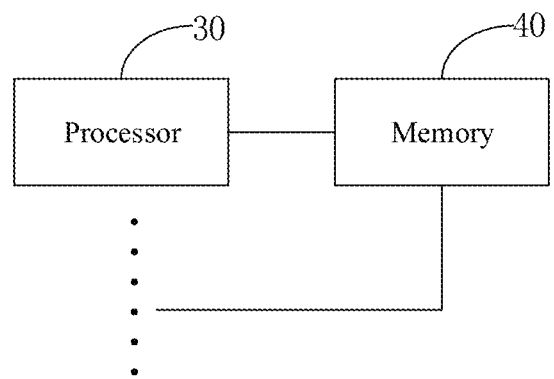
FIG. 3 is a structural diagram of a computer device according to an embodiment of the present disclosure.

FIG. 3 is a structural diagram of a computer device according to an embodiment the present disclosure. As shown in FIG. 3, the computer device according to this embodiment includes: one or more processors 30, and a memory 40 for storing one or more programs; the one or more programs stored in the memory 40, when executed by said one or more processors 30, enable said one or more processors 30 to implement the user's intent mining method according to the embodiment shown in FIG. 1. The embodiment shown in FIG. 3 exemplarily includes a plurality of processors 30.

Figure 4:
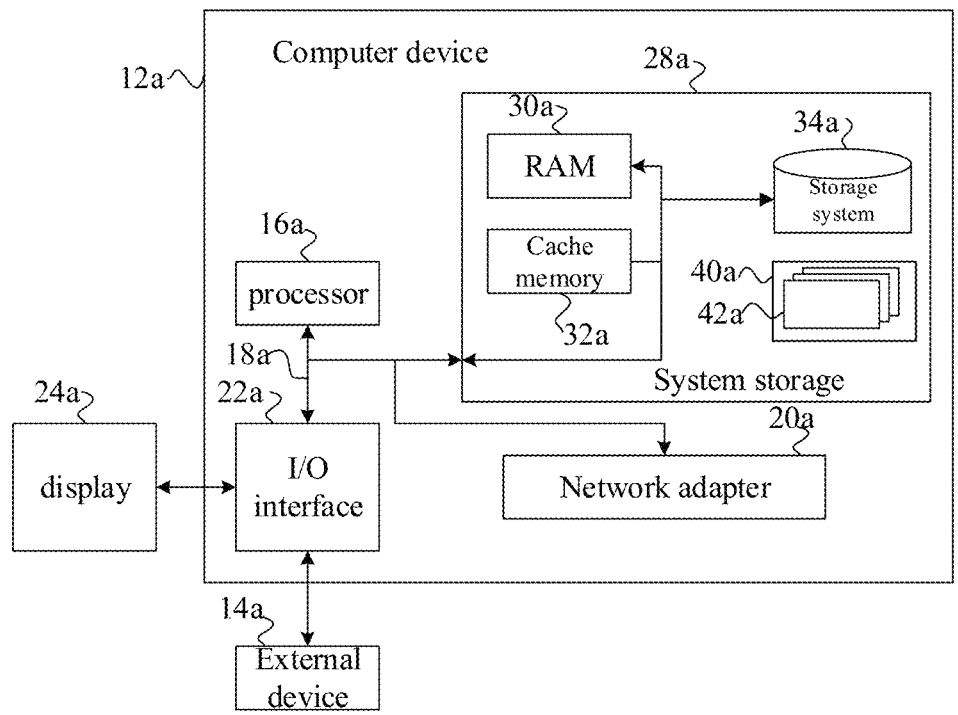
FIG. 4 is an example diagram of a computer device according to the present disclosure.

For example, FIG. 4 is an example diagram of a computer device according to the present disclosure. FIG. 4 shows a block diagram of an example computer device 12a adapted to implement an implementation mode of the present disclosure. The computer device 12a shown in FIG. 4 is only an example and should not bring about any limitation to the function and scope of use of the embodiments of the present disclosure.

As shown in FIG. 4, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 2 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 2 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the user's intent mining method shown in the above embodiments.

The present disclosure further provides a computer readable medium on which a computer program is stored, the program, when executed by a processor, implementing the user's intent mining method shown in the above embodiments.

The computer readable medium of this embodiment may include RAM 30a, and/or cache memory 32a and/or a storage system 34a in the system memory 28a in the embodiment shown in FIG. 4.

As science and technology develops, a propagation channel of the computer program is no longer limited to tangible medium, and it may also be directly downloaded from the network or obtained in other manners. Therefore, the computer readable medium in this embodiment may include a tangible medium as well as an intangible medium.

The computer-readable medium of this embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for user's intent mining, comprising:
    obtaining text feature information corresponding to behavior data of a user;
    extracting an intent information list corresponding to the behavior data of the user by using a pre-trained intent extracting model;
    obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation,
    wherein the behavior data of the user comprises at least one of real-time behavior data of the user and a plurality of pieces of historical behavior data of the user in a latest historical time period,
    wherein the behavior data of the user comprises a plurality of pieces of historical behavior data of the user in the latest historical time period, and the step of, obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation comprises:
        for each piece of the plurality of pieces of historical behavior data, calculating respectively semantic similarity between the text feature information corresponding to the historical behavior data and respective intent information included in the intent information list corresponding to the historical behavior data;
        for each piece of the plurality of pieces of historical behavior data, obtaining, from the intent information list corresponding to the historical behavior data, intent information whose semantic similarity with the text feature information corresponding to the historical behavior data is greater than the preset semantic similarity threshold, as candidate intent information, and obtaining a plurality of pieces of candidate intent information in total;
        obtaining N pieces of target intent information from the plurality of pieces of candidate intent information, and adding the N pieces of target intent information to the intent information queue for advertisement recommendation.

2. The method according to claim 1, wherein the obtaining text feature information corresponding to the behavior data of a user comprises:
    obtaining a title and key text content of a browsed page corresponding to the behavior data of the user;
    performing word segmentation for the title of the browsed page to obtain a plurality of segmented words of the title;
    extracting a plurality of content keywords from the key text content by using a pre-trained content keyword extracting model;
    combining the plurality of segmented words of the title and the plurality of content keywords to form the text feature information.

3. The method according to claim 1, wherein the obtaining target intent information of the user from the intent information list corresponding to the behavior data of the user, according to the text feature information and the intent information list corresponding to the behavior data of the user, and a preset semantic similarity threshold comprises:
    calculating respectively semantic similarity between the text feature information corresponding to the behavior data of the user and respective intent information included in the intent information list corresponding to the behavior data of the user;
    obtaining, from the intent information list corresponding to the behavior data of the user, intent information whose semantic similarity with the text feature information corresponding to the behavior data of the user is greater than the preset semantic similarity threshold, as the target intent information of the user.

4. A method for user's intent mining, comprising:
    obtaining text feature information corresponding to behavior data of a user;
    extracting an intent information list corresponding to the behavior data of the user by using a pre-trained intent extracting model;
    obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation, wherein the behavior data of the user comprises at least one of real-time behavior data of the user and a plurality of pieces of historical behavior data of the user in a latest historical time period, wherein the behavior data comprises a plurality of pieces of historical behavior data of the user in the latest first historical time period and a plurality of pieces of historical behavior data of the user in the latest second historical time period, and the first historical time period is larger than the second historical time period; and the step of, obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation comprises:

for each piece of the plurality of pieces of the historical behavior data in the first historical time period and second historical time period, calculating respectively semantic similarity between the text feature information corresponding to the historical behavior data and respective intent information included in the intent information list corresponding to the historical behavior data;

for each piece of the plurality of pieces of the historical behavior data in the first historical time period and second historical time period, obtaining, from the intent information list corresponding to the historical behavior data, intent information whose semantic similarity with the text feature information corresponding to the historical behavior data is greater than the preset semantic similarity threshold, as candidate intent information, and obtaining respectively M pieces of candidate intent information in the first historical time period and W pieces of candidate intent information in the second historical time period;

under the condition that W is smaller than a preset number N of target intent information, adding the W pieces of candidate intent information in the second historical time period to the intent information queue, as the target intent information of the user;

obtaining N-W pieces of target intent information from the M pieces of candidate intent information in the first historical time period, and adding the N-W pieces of target intent information to the intent information queue for advertisement recommendation.

5. A method for user's intent mining, comprising:

obtaining text feature information corresponding to behavior data of a user;

extracting an intent information list corresponding to the behavior data of the user by using a pre-trained intent extracting model;

obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation, wherein the behavior data of the user comprises at least one of real-time behavior data of the user and a plurality of pieces of historical behavior data of the user in a latest historical time period, wherein the behavior data comprises real-time behavior data and a plurality of historical behavior data in the latest historical time period, and the step of, obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation comprises:

obtaining S pieces of target intent information of the user corresponding to the real-time data, and adding the S pieces of target intent information of the user to the intent information queue;

under the condition that S is smaller than a preset number N of the target intent information, obtaining P pieces of candidate intent information corresponding to the plurality of pieces of historical behavior data;

obtaining N-S pieces of target intent information from the P pieces of candidate intent information, and adding the N-S pieces of target intent information to the intent information queue for advertisement recommendation.

6. A computer device, comprising:

one or more processors, a memory for storing one or more programs, the one or more programs, when executed by said one or more processors, enable said one or more processors to implement a method for user's intent mining, the method comprising:

obtaining text feature information corresponding to behavior data of a user;

extracting an intent information list corresponding to the behavior data of the user by using a pre-trained intent extracting model;

obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation, wherein the behavior data of the user comprises at least one of real-time behavior data of the user and a plurality of pieces of historical behavior data of the user in a latest historical time period, wherein the behavior data of the user comprises a plurality of pieces of historical behavior data of the user in the latest historical time period, and the step of, obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation comprises:

for each piece of the plurality of pieces of historical behavior data, calculating respectively semantic similarity between the text feature information corresponding to the historical behavior data and respective intent information included in the intent information list corresponding to the historical behavior data;

for each piece of the plurality of pieces of historical behavior data, obtaining, from the intent information list corresponding to the historical behavior data, intent information whose semantic similarity with the text feature information corresponding to the historical behavior data is greater than the preset semantic similarity threshold, as candidate intent information, and obtaining a plurality of pieces of candidate intent information in total;

obtaining N pieces of target intent information from the plurality of pieces of candidate intent information, and adding the N pieces of target intent information to the intent information queue for advertisement recommendation.

7. A non-transitory computer readable medium on which a computer program is stored, wherein the program, when executed by a processor, implements a method for user's intent mining, the method comprising:

obtaining text feature information corresponding to behavior data of a user;

extracting an intent information list corresponding to the behavior data of the user by using a pre-trained intent extracting model;

obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation, wherein the behavior data of the user comprises at least one of real-time behavior data of the user and a plurality of pieces of historical behavior data of the user in a latest historical time period, wherein the behavior data of the user comprises a plurality of pieces of historical behavior data of the user in the latest historical time period, and the step of, obtaining target intent information of the user from the intent information list corresponding to the behavior data of the user, according to the text feature information and the intent information list corresponding to the behavior data of the user, and a preset semantic similarity threshold, and adding the target intent information of the user to an intent information queue for advertisement recommendation comprises:

for each piece of the plurality of pieces of historical behavior data, calculating respectively semantic similarity between the text feature information corresponding to the historical behavior data and respective intent information included in the intent information list corresponding to the historical behavior data;

for each piece of the plurality of pieces of historical behavior data, obtaining, from the intent information list corresponding to the historical behavior data, intent information whose semantic similarity with the text feature information corresponding to the historical behavior data is greater than the preset semantic similarity threshold, as candidate intent information, and obtaining a plurality of pieces of candidate intent information in total;

obtaining N pieces of target intent information from the plurality of pieces of candidate intent information, and adding the N pieces of target intent information to the intent information queue for advertisement recommendation.

* * * * *